United States Patent
Shibuya (10) Patent No.: US 10,338,680 B2
(45) Date of Patent: Jul. 2, 2019

(54) OPERATING APPARATUS HAVING FEEDBACK MECHANISM

(71) Applicant: ALPINE ELECTRONICS, INC., Shinagawa-ku, Tokyo (JP)

(72) Inventor: Yasushi Shibuya, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 15/462,075

(22) Filed: Mar. 17, 2017

(65) Prior Publication Data
US 2017/0308167 A1 Oct. 26, 2017

(30) Foreign Application Priority Data
Apr. 22, 2016 (JP) ................... 2016-085836

(51) Int. Cl.
| | | |
|---|---|---|
| *G06F 3/01* | (2006.01) | |
| *G06F 3/041* | (2006.01) | |
| *G06F 3/044* | (2006.01) | |
| *G06F 1/16* | (2006.01) | |

(52) U.S. Cl.
CPC .............. *G06F 3/016* (2013.01); *G06F 3/044* (2013.01); *G06F 3/0412* (2013.01); *G06F 1/1626* (2013.01); *G06F 2203/04105* (2013.01)

(58) Field of Classification Search
CPC ........ G06F 3/016; G06F 3/0412; G06F 3/044; G06F 2203/04105
See application file for complete search history.

(56) References Cited

U.S. PATENT DOCUMENTS

| | | | | |
|---|---|---|---|---|
| 2008/0100177 A1* | 5/2008 | Dai | .......... | G06F 3/016 310/317 |
| 2009/0135145 A1* | 5/2009 | Chen | ....... | G06F 3/016 345/173 |
| 2019/0074425 A1* | 3/2019 | Nakao | ...... | B06B 1/06 |

FOREIGN PATENT DOCUMENTS

JP 2013-161384 8/2013

* cited by examiner

*Primary Examiner* — Dennis P Joseph
(74) *Attorney, Agent, or Firm* — Brinks Gilson & Lione (57) ABSTRACT

Provided is an operating apparatus having a feedback mechanism. An apparatus main body is supported on a base using a plurality of plurality of supporting metal plates. Each of the supporting metal plates includes a first mounting piece, a second mounting piece, and an intermediate plate. When a pressing force of a finger on an operating surface of the apparatus main body acts, the intermediate plate is deformed to depress the apparatus main body, thereby operating a detecting member. When a feedback force from the feedback mechanism acts on the apparatus main body, the second mounting piece is bent to move the apparatus main body along the feedback force.

6 Claims, 7 Drawing Sheets

OPERATING APPARATUS HAVING FEEDBACK MECHANISM

RELATED APPLICATION

The present application claims priority to Japanese Patent Application Number 2016-085836, filed Apr. 22, 2016, the entirety of which is hereby incorporated by reference.

BACKGROUND

1. Field

The present disclosure relates to an operating apparatus having a feedback mechanism for applying a feedback force to an operation main body when pressure is applied.

2. Description of the Related Art

Japanese Unexamined Patent Application Publication No. 2013-161384 discloses an input apparatus having a feedback mechanism.

In this input apparatus, a first elastic member, which is a plate spring, is fixed on a support base, and a movable base is supported by the first elastic member so as to be movable in a horizontal direction. A second elastic member made of rubber is disposed on the movable base, and a panel assembly is disposed on the second elastic member. As the second elastic member is contracted, the panel assembly is pushed in a vertical direction on the movable base. The panel assembly includes a display member and a capacitance-type first detecting member.

The movable base is provided with a second detecting member, which is a force sensor, with which the fact that the panel assembly is pushed in the vertical direction can be detected. A third elastic member made of rubber is disposed on the movable base, on which a vibration generating member is disposed.

With this input apparatus, when the panel assembly is pushed in the vertical direction, the pressure is detected by the second detecting member disposed on the movable base, and the vibration generating member operates on the basis of the detection to apply a horizontal vibrating force (feedback force) to the movable base The input apparatus disclosed in Japanese Unexamined Patent Application Publication No. 2013-161384 includes a movable base and a panel assembly disposed in two-stage structure on a support base and includes a first elastic member (a plate spring) for moving the movable base in a direction in which a vibrating force acts and a second elastic member (a rubber member) for moving the panel assembly in a push direction as separate members. This increases the number of elastic members needed, increasing the number of components.

Furthermore, a second detecting member (a force sensor) for detecting a pushing operation on the panel assembly and a vibration generating member are disposed between the movable base and the panel assembly. Since the movable base and the panel assembly are layered in two-stage structure, and the second detecting member and the vibration generating member are disposed between the movable base and the panel assembly, it is difficult to achieve a thin low profile of the overall structure of the input apparatus.

SUMMARY

The present disclosure solves the above problems of the related art. Accordingly, it is an object of the present disclosure to provide an operating apparatus in which the number of elastic members is reduced, low profile structure is achieved, and the apparatus main body can be moved in a push direction when an operating surface is pressed, and which has a feedback mechanism capable of moving the apparatus main body in a horizontal direction.

An operating apparatus according to an aspect of the present disclosure includes an apparatus main body whose surface is an operating surface, a detecting member configured to detect that the operating surface is pushed, a feedback mechanism in the apparatus main body, and a plurality of supporting metal plates configured to fix the apparatus main body to a base. Each of the supporting metal plates includes a first mounting piece to be fixed to one of the apparatus main body and the base, a second mounting piece to be fixed to another of the apparatus main body and the base, and an intermediate plate between the first mounting piece and the second mounting piece. The first mounting piece, the second mounting piece, and the intermediate plate are integrally formed. A plate face of the first mounting piece is disposed substantially parallel to the operating surface, and at least part of a plate face of the second mounting piece is disposed substantially perpendicularly to the operating surface. When the operating surface is pushed, the intermediate plate can be elastically deformed in a push direction and a feedback force in a direction intersecting the plate face of the second mounting piece is applied to the apparatus main body by the feedback mechanism.

In the operating apparatus, the plurality of supporting metal plates may be disposed such that the second mounting pieces are parallel to one another in a same direction.

In the operating apparatus, the supporting metal plate may be bent along a boundary between the first mounting piece and the intermediate plate and along a boundary between the intermediate plate and the second mounting piece, and a plate face of the intermediate plate may be inclined with respect to both of the plate face of the first mounting piece and the plate face of the second mounting piece.

In the operating apparatus, the first mounting piece and the second mounting piece of the supporting metal plate may be continuous via a curved surface having a predetermined curvature, and the curved surface may form the intermediate plate.

In the operating apparatus, the supporting metal plate may be bent along a boundary between the first mounting piece and the second mounting piece, a plate face of the first mounting piece and a plate face of the second mounting piece may oppose substantially at right angles, a portion from an intermediate point of the first mounting piece to the boundary may form the intermediate plate, and the intermediate plate may overhang the apparatus main body or the base.

In the operating apparatus, bending rigidity of the supporting metal plate is preferably higher when the second mounting piece is bent in a direction perpendicular to the operating surface than when the second mounting piece is bent in a direction parallel to the operating surface.

An input apparatus according to an embodiment of the present disclosure includes a plurality of supporting metal plates that support an apparatus main body on a base. Elastic deformation of the supporting metal plate allows the apparatus main body to be moved in a direction in which a feedback force acts and an operating surface to be moved in a push direction. This eliminates the need for separately providing an elastic member for moving the apparatus main body in a direction in which the feedback force acts and an elastic member for moving the apparatus main body in the push direction, thus decreasing the number of components. This also eliminates the need for adopting a forward layered structure, as in the related art, allowing a low-profile structure.

DETAILED DESCRIPTION

Figure 1:
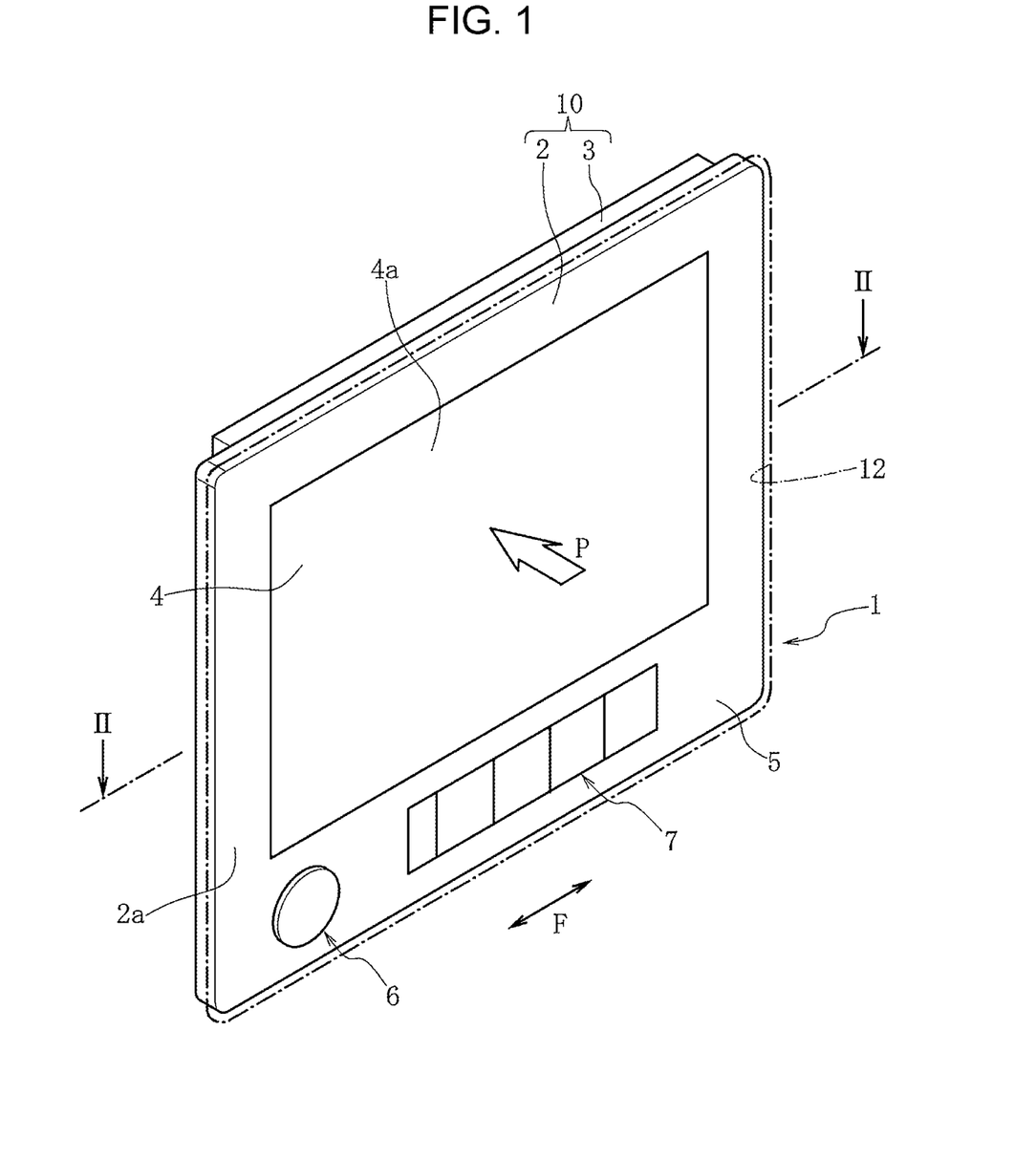
FIG. 1 is an external perspective view of an operating apparatus having a feedback mechanism according to an embodiment of the present disclosure, illustrating a state in which the operating apparatus is mounted to an instrument panel of a vehicle.
Figure 2:
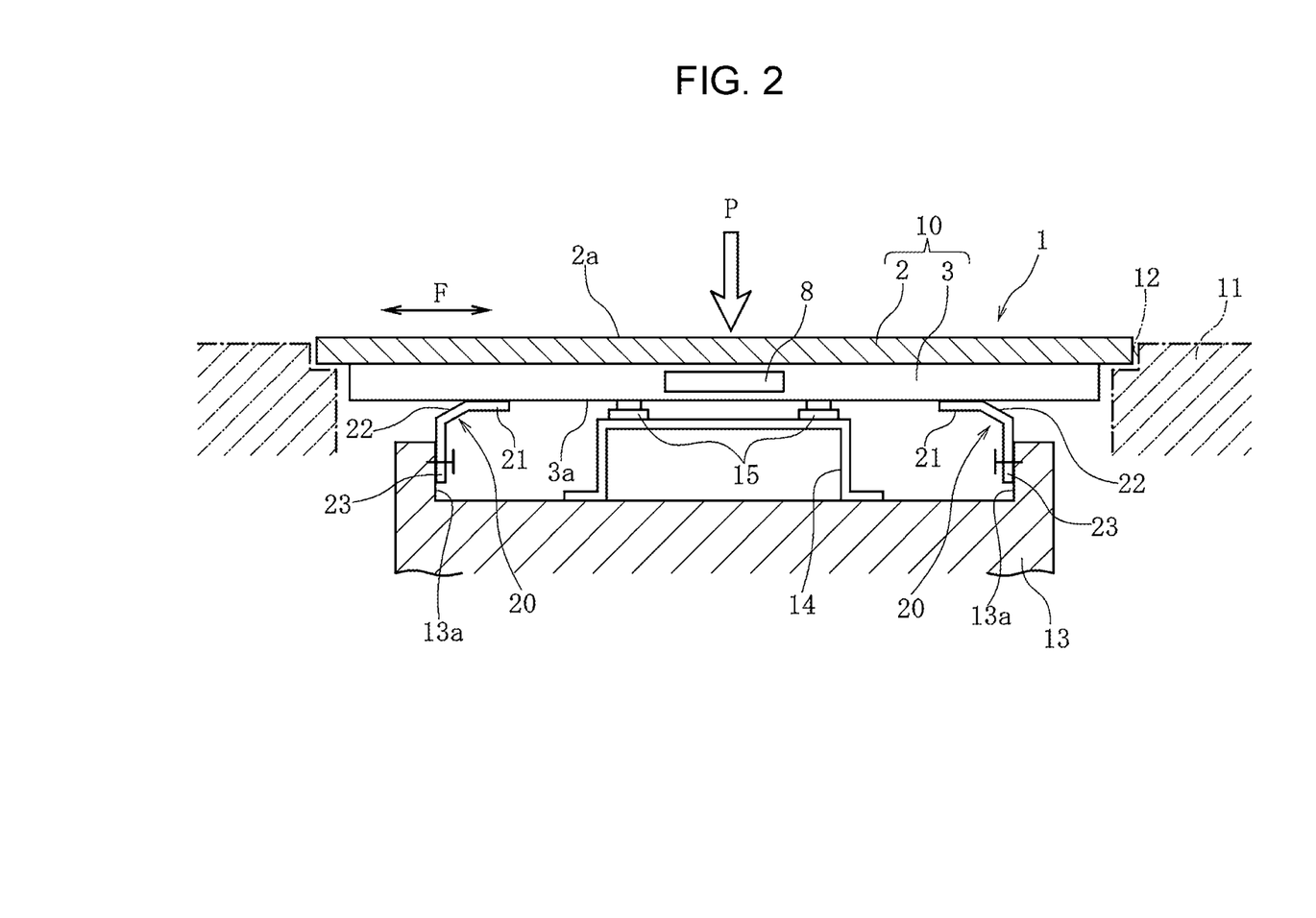
FIG. 2 is a cross-sectional view of the operating apparatus having the feedback mechanism illustrated in FIG. 1, taken along line II-II.

FIGS. 1 and 2 illustrate an operating apparatus 1 having a feedback mechanism according to an embodiment of the present disclosure. The operating apparatus 1 is for in-vehicle use.

The operating apparatus 1 includes an apparatus main body 10. The apparatus main body 10 includes a panel unit 2 on the front and a casing 3 at the back. The front surface of the panel unit 2 forms a decorative surface 2a. As illustrated in FIG. 1, the central wide area of the decorative surface 2a is a display and operating area 4, and a frame-like area enclosing the display and operating area 4 is a decorated area 5.

The display and operating area 4 has a light-transmissive panel on its surface and a light-transmissive touch sensor and a display unit, such as a color liquid-crystal display panel, in this order, inside thereof. The surface panel is made up of a glass plate or a synthetic resin plate, such as an acrylic resin plate. The touch sensor is a transparent substrate on which a plurality of transparent electrodes is disposed to detect a change in electrostatic capacitance with the electrodes when a human finger touches the surface of the surface panel, thereby detecting a position touched by the finger. Thus, the surface of the display and operating area 4 in the panel unit 2 is an operating surface 4a to be pressed by a finger.

A display screen generated on the display unit can be viewed from the front through the touch sensor and the surface panel.

The decorated area 5 takes on a predetermined hue due to the synthetic resin material of the panel unit 2. As illustrated in FIG. 1, the decorated area 5 is provided with a rotary operating member 6 and a push-type operating member 7.

The casing 3 is a metal case formed of a rolled steel plate or an aluminum plate. The panel unit 2 is fixed to the front of the casing 3 by screwing or the like. The display unit and operating electronic components operated by the operating members 6 and 7 are housed in the casing 3.

As illustrated in FIG. 2, a feedback mechanism 8 is housed in the apparatus main body 10, that is, in the casing 3. As the feedback mechanism 8 operates, a feedback force F is applied to the apparatus main body 10. The feedback mechanism 8 is provided with a solenoid that exhibits a magnetic attractive force. One of a magnetic driving unit and a plunger that is driven forward and backward by the magnetic driving unit of the solenoid is directly fixed to the casing 3, and the other is joined to the casing 3 via an elastic member, such as rubber. Due to the magnetic attractive force of the plunger in the solenoid, the horizontal feedback force F acts on the apparatus main body 10. The feedback force F is an impact force based on a singly generated magnetic attractive force, or a vibrating force of a predetermined frequency.

Alternatively, the feedback mechanism 8 may be a vibration generating mechanism made up of a magnet, which is a weight supported so as to be movable in an F-direction by a spring member and a coil that reciprocates the magnet in a direction in which the force F is generated. Alternatively, the feedback mechanism 8 may include a motor having a rotation shaft perpendicular to the direction of the force F and a weight fixed to the rotation shaft and deflecting in mass to generate a vibrating force in the F-direction using the rotational force of the rotation shaft.

In FIGS. 1 and 2, the direction of the feedback force F applied to the apparatus main body 10 by the feedback mechanism 8 and the direction of a pressing force P when the operating surface 4a, which is the surface of the panel unit 2, is pushed by a finger are indicated by arrows. In this case, it is assumed that the pressing force P acts perpendicularly to the operating surface 4a.

The operating apparatus 1 is disposed on an instrument panel 11 of a vehicle. As illustrated in FIGS. 1 and 2, the instrument panel 11 has a rectangular opening 12, and the apparatus main body 10 is located in the opening 12. Between the outer edge of the apparatus main body 10 and the inner edge of the opening 12, small clearance is provided in a horizontal direction, which is the direction in which the feedback force F acts, and a vertical direction, which is the direction of gravity perpendicular thereto.

As illustrated in FIG. 2, a base 13 is provided in the opening 12 of the instrument panel 11. The base 13 is part of a vehicle structure or an inner structure of the instrument panel 11. The operating apparatus 1 is supported by a plurality of supporting metal plates 20 at the front of the base 13. The supporting metal plates 20 are each made of a metal plate having a certain degree of elasticity, for example, a cold rolled steel plate.

Figure 3:
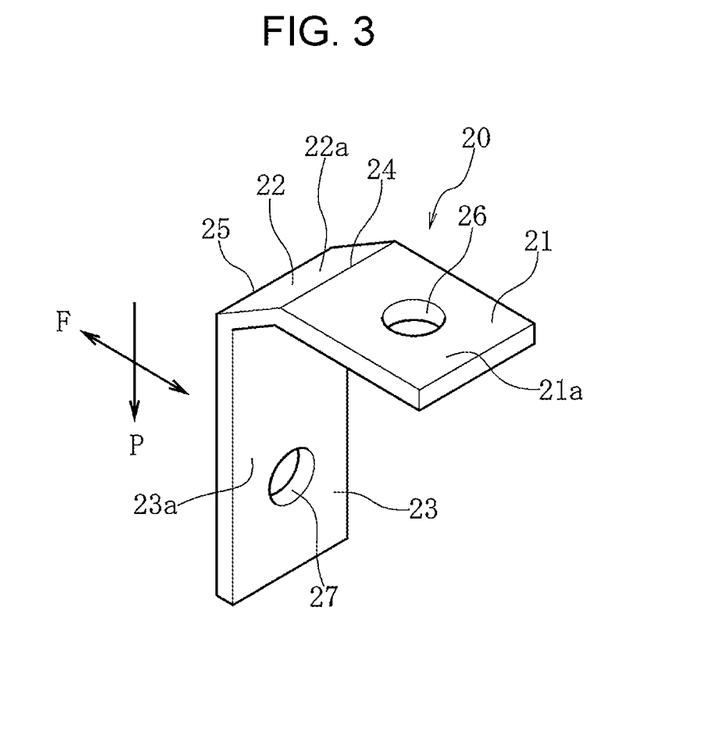
FIG. 3 is a perspective view of a supporting metal plate.
Figure 4A:
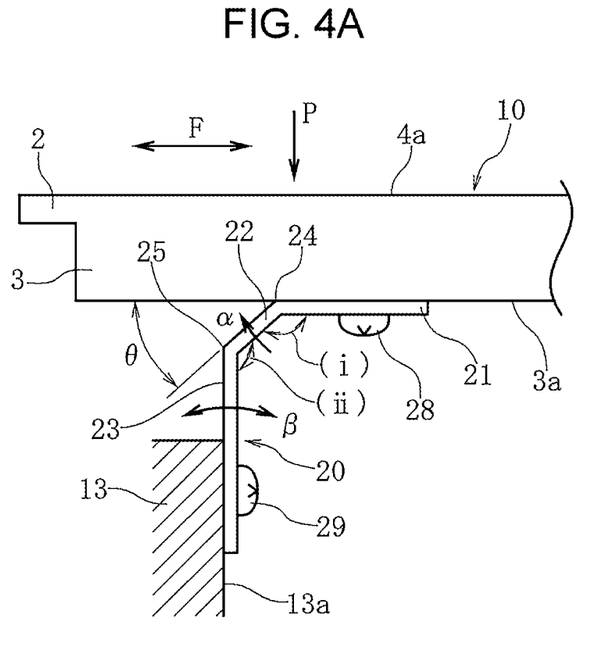
FIG. 4A is an enlarged explanatory diagram of a portion at which the supporting metal plate illustrated in FIG. 3 is attached.

As illustrated in FIGS. 3 and 4A, each supporting metal plate 20 is formed by bending a belt-like metal plate having substantially uniform plate thickness and width. The supporting metal plate 20 includes a first mounting piece 21, an intermediate plate 22, and a second mounting piece 23 which are continuously formed. A plate face 21a of the first mounting piece 21 and a plate face 23a of the second mounting piece 23 form a right angle in design. The plate face 21a of the first mounting piece 21 extends in the direction in which the feedback force F applied to the apparatus main body 10 acts, and the plate face 21a is parallel to the operating surface 4a. The plate face 23a of the second mounting piece 23 extends in the direction in which the pressing force P applied to the operating surface 4a acts. The plate face 23a is perpendicular to the operating surface 4a.

The first mounting piece 21 and the intermediate plate 22 are bent along a boundary 24, and the intermediate plate 22 and the second mounting piece 23 are bent along a boundary 25. The plate face 22a of the intermediate plate 22 is flat and is inclined with respect to both of the plate face 21a of the first mounting piece 21 and the plate face 23a of the second mounting piece 23.

The first mounting piece 21 has a fixing hole 26, and the second mounting piece 23 has a fixing hole 27.

In the embodiment illustrated in FIGS. 2 and 4A, the first mounting piece 21 of the supporting metal plate 20 is disposed on a back face 3a of the casing 3 of the apparatus main body 10 and is fixed to the casing 3 with a fixing screw 28 screwed through the fixing hole 26. The second mounting piece 23 is disposed on a support face 13a of the base 13 perpendicular to the operating surface 4a and is fixed to the base 13 with a fixing screw 29 screwed through the fixing hole 27.

As illustrated in FIG. 2, the second mounting piece 23 is perpendicular to the operating surface 4a, and the plate faces 23a of the second mounting pieces 23 of all the supporting metal plates 20 are parallel to one another. The direction of the plate thickness of the second mounting piece 23 is in the direction of the action of the feedback force F (a direction parallel to the operating surface 4a). Alternatively, part of the second mounting pieces 23 may be flat, and their thickness direction may be parallel to the direction of the action of the feedback force F, and the other of the second mounting pieces 23 may be formed in U-shape.

As illustrated in FIG. 4A, the intermediate plate 22 of the supporting metal plate 20 extends diagonally backward at an angle θ with respect to a back face 3a of the casing 3. The angle θ is preferably in the range of 30 to 60 degrees, and in this embodiment, the angle θ is 45 degrees.

As illustrated in FIG. 2, a detection supporting unit 14 is fixed to the base 13, and a plurality of detecting members 15 are mounted to the detection supporting unit 14. The detecting members 15 are force sensors or proximity sensors. Each force sensor includes an elastically deformed portion and a strain gauge. When receiving the pressing force P from the apparatus main body 10, the elastically deformed portion is deformed under the load. The strain gauge detects the deformation of the elastically deformed portion. Each proximity sensor includes a magnet provided on the back face of the casing 3 and a magnetic sensor provided at the detection supporting unit 14 and detecting a change in distance from the magnet.

Alternatively, a finger contact area may be detected by the capacitance-type touch sensor provided inside the panel unit 2 of the apparatus main body 10, and the pressing force P may be estimated from the contact area. In this case, the magnitude of the pressing force P and the size of the finger contact area are not necessarily proportional to each other and can cause malfunction. For that reason, using the force sensor or the proximity sensor to detect the displacement of the apparatus main body 10 as in this embodiment ensures detection of a pressing operation.

Next, the operation of the operating apparatus 1 will be described. With this operating apparatus 1, an image displayed on the display unit provided inside the apparatus main body 10 can be viewed from the front in the display and operating area 4 through the touch sensor and the surface panel of the panel unit 2. The operating apparatus 1 can be operated using the operating members 6 and 7 provided in the decorated area 5. Furthermore, the user can perform an input operation also by touching the operating surface 4a on the surface of the display and operating area 4 with a finger while viewing an image displayed on the display and operating area 4.

With this input operation, when the user touches an image of an operation button displayed on the display and operating area 4 with a finger, it is determined from the output of coordinates detected by the touch sensor which operation button the finger touched. When the operating surface 4a is depressed with the finger, the intermediate plate 22 of the supporting metal plate 20 is elastically deformed to collapse in direction α (see FIG. 4A) with the boundary 24 as a fulcrum to allow the apparatus main body 10 to move in the push direction, and the pressing force P at that time is detected by the detecting member 15. A control unit determines from the output of the touch sensor which operation button image of the images displayed in the display and operating area 4 is operated, and when the pressing force P is detected by the detecting members 15, the control unit starts a processing operation based on the display content of the pressed operation button.

When the detecting member 15 detects the pressing force P, a motion instruction is output from the control unit to the feedback mechanism 8, and the horizontal feedback force F is applied to the apparatus main body 10 as a single force or vibration. As illustrated in FIG. 4A, the thickness direction of the second mounting piece 23 of the supporting metal plate 20 is in the direction of action of the feedback force F. This allows the second mounting piece 23 to be bent in the thickness direction (direction β) with the feedback force F. This allows the operating surface 4a to move or vibrate in the direction in which the feedback force F is applied to transmit the feedback force F to the operator who touches the operating surface 4a with the finger.

As illustrated in FIG. 4A, for the direction of the action of the feedback force F, the second mounting piece 23 of the supporting metal plate 20 is bent in the direction α, which is the thickness direction. When the pressing force P is applied from the apparatus main body 10, the intermediate plate 22 is deformed to collapse in the direction α with the boundary 24 as a fulcrum. At that time, at the boundary 24, the supporting metal plate 20 is deformed in such a manner that an opposing angle (i) between the first mounting piece 21 and the intermediate plate 22 is widen, and at the boundary 25, the supporting metal plate 20 is deformed in such a manner that an opposing angle (ii) between the intermediate plate 22 and the second mounting piece 23 is narrowed. Thus, the bending rigidity (the modulus of elasticity) of the supporting metal plate 20 when the apparatus main body 10 is pushed with the pressing force P is sufficiently higher than the bending rigidity (the modulus of elasticity) of the supporting metal plate 20 when the apparatus main body 10 moves in the direction of the feedback force F.

This provides a sufficient resisting force when the operating surface 4a of the apparatus main body 10 is pushed with a finger, allowing the operator to receive operation feeling of sufficiently strong pressure with a finger. At that time, slight movement of the apparatus main body 10 in the direction of action of the pressing force P can be detected using the detecting member 15, such as a force sensor. When the feedback mechanism 8 operates to apply the horizontal feedback force F to the apparatus main body 10, the apparatus main body 10 relatively easily moves in the direction of the feedback force F, so that the operator can sufficiently feel the feedback force F with the finger touching the operating surface 4a.

Figure 4B:
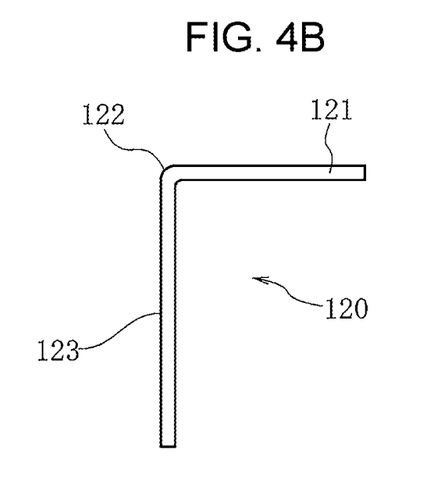
FIG. 4B is an explanatory diagram illustrating a conventional supporting metal plate of a comparative example.

However, the rigidity of the supporting metal plate 20 in the direction of the force F can be held sufficiently high. FIG. 4B illustrates a supporting metal plate 120 of a comparative example. The supporting metal plate 120 includes a first mounting piece 121 and a second mounting piece 123 that form a right angle along a boundary 122 and no intermediate plate. Using the supporting metal plate 120 of the comparative example instead of the supporting metal plate 20 allows the bending rigidity (the modulus of elasticity) in the direction in which the feedback force F acts to be substantially equal to that of the supporting metal plate 20 of the embodiment.

In other words, the bending rigidity of the supporting metal plate 20 of the embodiment in the direction of the force F is equal to that of the supporting metal plate 120 because of the structure in which the intermediate plate 22 is formed between the first mounting piece 21 and the second mounting piece 23, which are perpendicular to each other, and in which the opposing angle (i) between the first mounting piece 21 and the intermediate plate 22 and the opposing angle (ii) between the intermediate plate 22 and the second mounting piece 23 are set at obtuse angles. Accordingly, the structure illustrated in FIG. 4A in which the apparatus main body 10 is supported using the supporting metal plate 20 exhibits supporting strength against vehicle vibration and so on equal to that using the supporting metal plate 120 of the comparative example.

Figure 5:
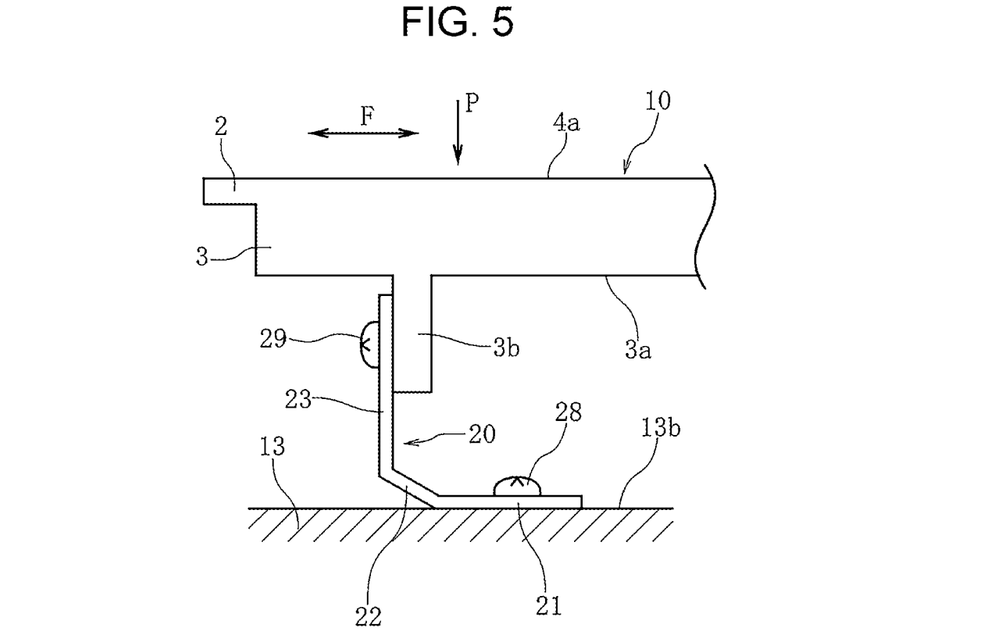
FIG. 5 is an enlarged explanatory diagram illustrating another usage example of the supporting metal plate illustrated in FIG. 3.

FIG. 5 illustrates another usage example of the supporting metal plate 20 illustrated in FIG. 3. In this usage example, the first mounting piece 21 of the supporting metal plate 20 is fixed to a surface 13b of the base 13 parallel to the operating surface 4a with a fixing screw 28. The casing 3 of the apparatus main body 10 has a fixing protrusion 3b protruding backward from the back face 3a. The second mounting piece 23 is disposed on a side surface of the fixing protrusion 3b and is secured with a fixing screw 29. In the usage example illustrated in FIG. 5, the supporting metal plate 20 is elastically deformed when the pressing force P is applied to the apparatus main body 10 and when the feedback force F acts on the apparatus main body 10, as in the usage example in FIG. 4A, so that the bending rigidity of the supporting metal plate 20 in the direction F and the direction P are the same between FIG. 4A and FIG. 5.

FIGS. 6 to 9 illustrate mounting structures of supporting metal plates in other embodiments of the present disclosure.

Figure 6:
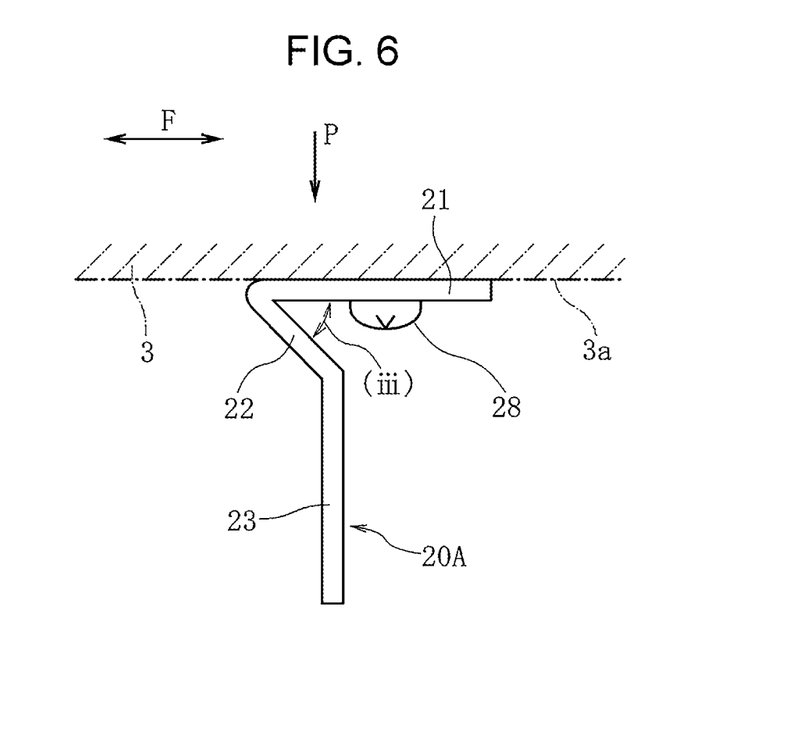
FIG. 6 is an enlarged explanatory diagram illustrating a portion at which a supporting metal plate according to another embodiment is attached.

In the embodiment illustrated in FIG. 6, the opposing angle (iii) of a first mounting piece 21 and an intermediate plate 22 of a supporting metal plate 20A is an acute angle. In the embodiment illustrated in FIG. 7, a first mounting piece 21 and a second mounting piece 23 of a supporting metal plate 20B are continuous via a curved surface having a predetermined curvature, and the curved surface forms an intermediate plate 22.

Figure 7:
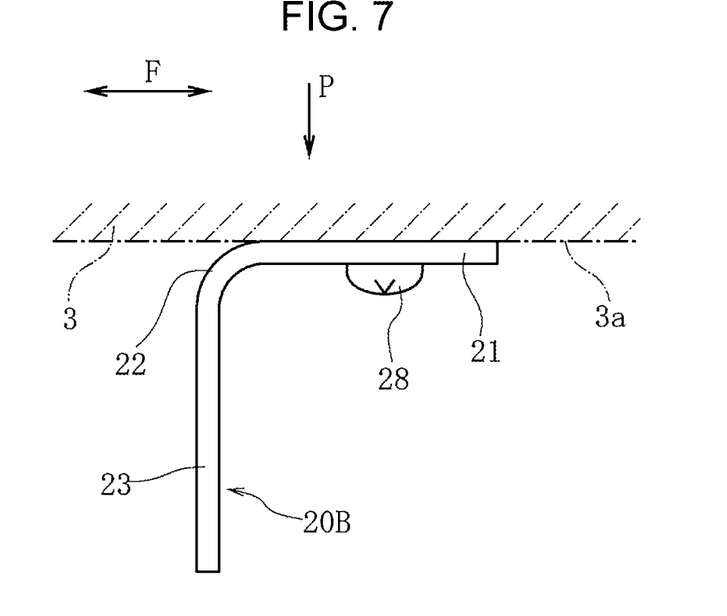
FIG. 7 is an enlarged explanatory diagram illustrating a portion at which a supporting metal plate according to another embodiment is attached.

In the embodiments illustrated in FIGS. 6 and 7, the bending rigidity of the supporting metal plates 20A and 20B when the feedback force F acts on the apparatus main body 10 and the pressing force P acts on the apparatus main body 10 is substantially the same as that in the embodiment illustrated in FIG. 4A.

Figure 8:
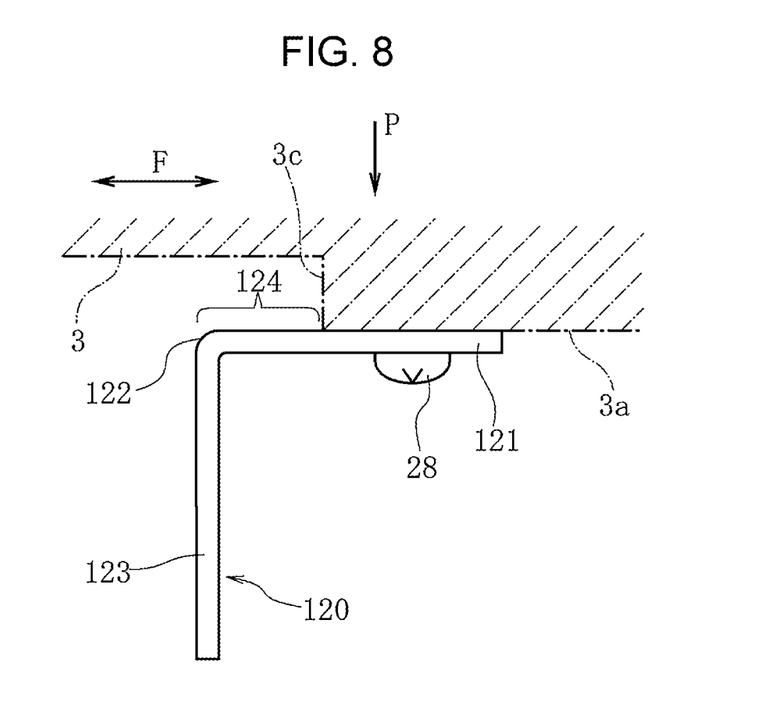
FIG. 8 is an enlarged explanatory diagram illustrating a portion at which a supporting metal plate according to another embodiment is attached.

The embodiment illustrated in FIG. 8 uses a supporting metal plate 120 having the same L-shape as the shape illustrated in FIG. 4B. The back face 3a of the casing 3 has a level-difference portion 3c. Part of a first mounting piece 121 is fixed to the back face 3a, and the other part of the first mounting piece 121 from an intermediate portion to a boundary 122 projects over the casing 3 from the level-difference portion 3c. This overhanging portion forms an intermediate plate 124 that can be elastically deformed when the pressing force P acts.

Figure 9:
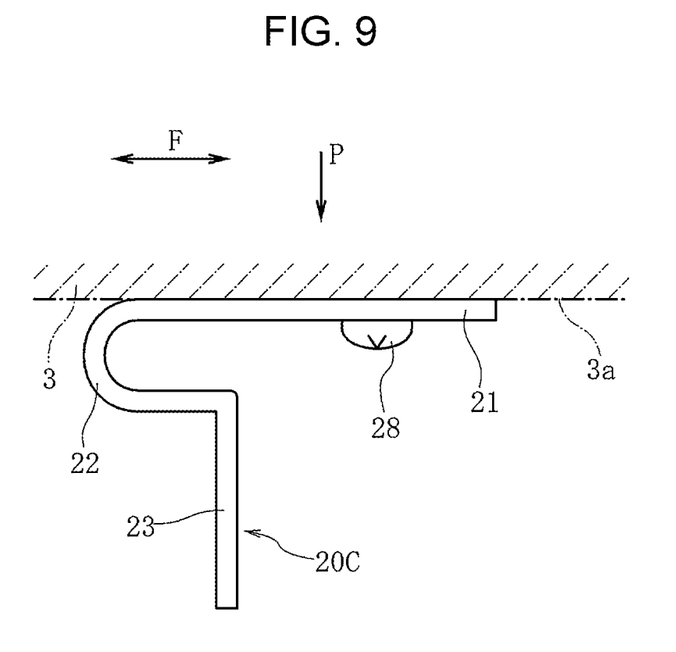
FIG. 9 is an enlarged explanatory diagram illustrating a portion at which a supporting metal plate according to another embodiment is attached.

The embodiment illustrated in FIG. 9 has a U-shaped intermediate plate 22 between a first mounting piece 21 and a second mounting piece 23 of a supporting metal plate 20C. When the apparatus main body 10 is acted upon by the pressing force P, the U-shaped intermediate plate 22 can be elastically deformed. In this embodiment, the bending rigidity in the direction of action of the pressing force P is slightly lower that that in the embodiment illustrated in FIG. 4A.

What is claimed is:

1. An operating apparatus comprising:
   a panel unit having a display whose surface is an operating surface;
   a detecting member comprising a sensor configured to detect that the operating surface is pushed;
   a vibrating force feedback mechanism positioned on the panel unit, the vibrating force feedback mechanism configured to apply a vibrating feedback force to the panel unit in a direction substantially parallel to the operating surface; and
   a plurality of supporting metal plates configured to fix the panel unit to a base,
   wherein each of the supporting metal plates comprises a first mounting piece to be fixed to one of the panel unit and the base, a second mounting piece to be fixed to another of the panel unit and the base, and an intermediate plate between the first mounting piece and the second mounting piece, the first mounting piece, the second mounting piece, and the intermediate plate being integrally formed,
   wherein a plate face of the first mounting piece is disposed substantially parallel to the operating surface, and at least part of a plate face of the second mounting piece is disposed substantially perpendicularly to the operating surface,
   wherein, the intermediate plate can be elastically deformed in a push direction when the operating surface is pushed, and
   wherein, the second mounting piece can be bent in a direction intersecting the plate face of the second mounting piece when the vibrating feedback force in the direction substantially parallel to the panel unit is applied to the apparatus main body by the feedback mechanism.

2. The operating apparatus according to claim 1, wherein the plurality of supporting metal plates are disposed such that the second mounting pieces are parallel to one another in a same direction.

3. The operating apparatus according to claim 1,
   wherein the supporting metal plate is bent along a boundary between the first mounting piece and the intermediate plate and along a boundary between the intermediate plate and the second mounting piece, and
   wherein a plate face of the intermediate plate is inclined with respect to both of the plate face of the first mounting piece and the plate face of the second mounting piece.

4. The operating apparatus according to claim 1, wherein the first mounting piece and the second mounting piece of the supporting metal plate are continuous via a curved surface having a predetermined curvature, the curved surface forming the intermediate plate.

5. The operating apparatus according to claim 1,
wherein the supporting metal plate is bent along a boundary between the first mounting piece and the second mounting piece,
wherein a plate face of the first mounting piece and a plate face of the second mounting piece oppose substantially at right angles, and
wherein a portion from an intermediate point of the first mounting piece to the boundary forms the intermediate plate, the intermediate plate overhanging the panel unit or the base.

6. The operating apparatus according to claim 1, wherein bending rigidity of the supporting metal plate is higher when the second mounting piece is bent in a direction perpendicular to the operating surface than when the second mounting piece is bent in a direction parallel to the operating surface.

\* \* \* \* \*